(12) United States Patent
Hungerford

(10) Patent No.: US 6,212,040 B1
(45) Date of Patent: Apr. 3, 2001

(54) MAGNETIC HEAD HAVING POLE TIPS EXTENDING ABOVE AND OFF A TRANSVERSE WIDTH OF AN ISOLATED MESA

(75) Inventor: Geoffrey Alan Hungerford, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/226,898

(22) Filed: Jan. 9, 1999

(51) Int. Cl.[7] ............................... G11B 5/60; G11B 15/60
(52) U.S. Cl. ....................................... 360/221; 360/130.21
(58) Field of Search ............................. 360/122, 130.21, 360/220, 221, 224

(56) References Cited

U.S. PATENT DOCUMENTS

| 4,949,208 | * | 8/1990 | Milo | 360/122 |
| 5,883,770 | * | 3/1999 | Biskeborn | 360/130.21 |

* cited by examiner

*Primary Examiner*—A. J. Heinz
(74) *Attorney, Agent, or Firm*—Brooks & Kushman P.C.

(57) ABSTRACT

A magnetic head that delays the onset of pole tip recession. Each read and write transducer protrudes out from a mesa, which in turn protrudes out of the magnetic head's tape bearing surface. The initial protrusion distance extends the magnetic head's expected life. The mesas define the shape and position of the active portion of the transducers. Additionally, the mesas may be situated in recessed channels formed in the tape bearing surface. Lowering the mesas into the recessed channels slows the transducer wear rate by supporting the magnetic medium over a larger area.

18 Claims, 2 Drawing Sheets

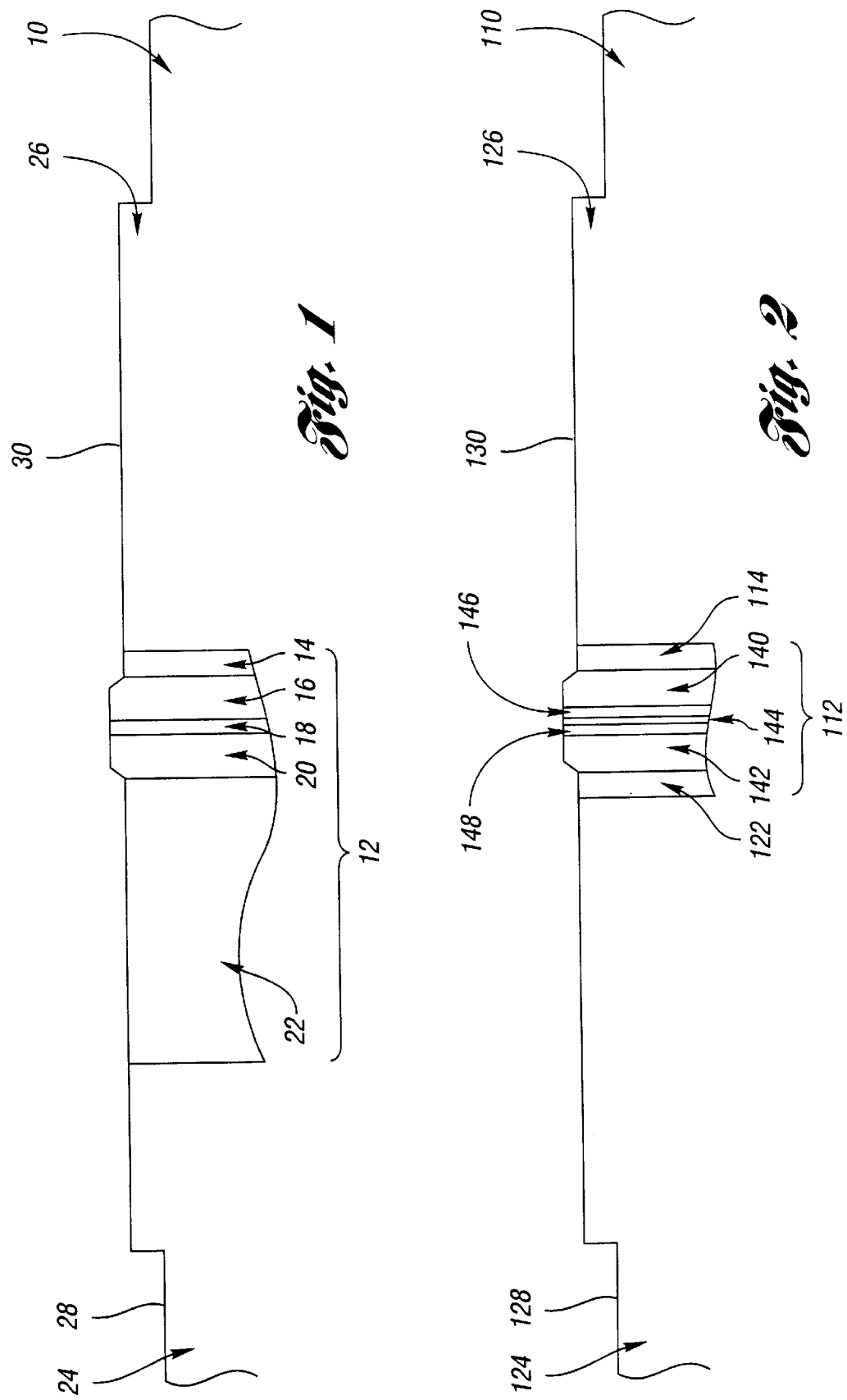

MAGNETIC HEAD HAVING POLE TIPS EXTENDING ABOVE AND OFF A TRANSVERSE WIDTH OF AN ISOLATED MESA

TECHNICAL FIELD

The present invention relates to the field of magnetic heads having transducers that protrude beyond the tape bearing surface.

BACKGROUND ART

The tape bearing surface of magnetic tape heads contain the transducers that read and write data to and from a magnetic tape. In magnetic disk heads, this surface is referred to as the air bearing surface. Tape bearing surfaces and air bearing surfaces of common thin film magnetic heads generally consist of three regions, a substrate, a thin film region that contains the magnetic transducers, and a closure. Each region is made up of one or more materials that have a variety of characteristics such as resistance to media wear, machinability, magnetic properties, electronic properties, corrosion resistance, ease of deposition, and ease of thin film pattern definition. Substrates and closures are usually made of hard, nonmagnetic materials. The bulk of each thin film region is formed with a nonmagnetic insulator. Pole tips and shields consist of "soft" magnetic materials. (In this context, "soft" magnetic material means that the material demagnetizes rapidly.) While read transducers consist of a very thin layer of a magneto-resistive material.

Friction between the magnetic medium and the magnetic head causes the tape bearing surface to wear. Characteristic differences in the various tape bearing surface materials result in uneven wear. In particular, the substrate and closure materials generally wear slower than the thin film and magnetic materials. Over time, a gap forms between the magnetic media and the transducers. This phenomenon is called pole tip recession. Gaps as narrow as 60 nanometers can make a magnetic head ineffective. Pole tip recession becomes more acute as magnetic field strengths are reduced to record higher information densities in the magnetic medium.

Past approaches to control pole tip recession have attempted to maintain a planar tape bearing surface. The theory being that if all of the materials wear at the same rate, pole tip recession will not take place. These approaches have had limited success because the varied magnetic, electrical, mechanical and chemical constraints placed on the materials prevent the selection of materials with a uniform wear rate.

DISCLOSURE OF INVENTION

The present invention provides a magnetic head that delays the onset of pole tip recession. Each read and write transducer protrudes out of a mesa, which in turn protrudes out from the magnetic head's tape bearing surface. The initial protrusion distance extends the magnetic head's expected life. The mesas define the shape and position of the active portion of the transducers. Additionally, the mesas may be situated in recessed channels formed in the tape bearing surface. Lowering the mesas into the recessed channels slows the transducer wear rate by supporting the magnetic medium over a larger area.

Accordingly, it is an object of the present invention to provide good contact between the transducers and magnetic medium by protruding the transducers out of mesas that in turn protrude out of the tape bearing surface.

Another object of the present invention is to slow the wear rate of the protruding transducers by positioning the mesas inside recessed channels formed in the tape bearing surface.

These and other objects, features and advantages will be readily apparent upon consideration of the following detailed description in conjunction with the accompanying drawings.

BRIEF DESCRIPTION OF DRAWINGS

FIG. 1 is a fragmented cross-sectional view of a thin film write head in accordance with the present invention;

FIG. 2 is a fragmented cross-sectional view of a thin film read head with shields in accordance with the present invention;

BEST MODE FOR CARRYING OUT THE INVENTION

Figure 3:
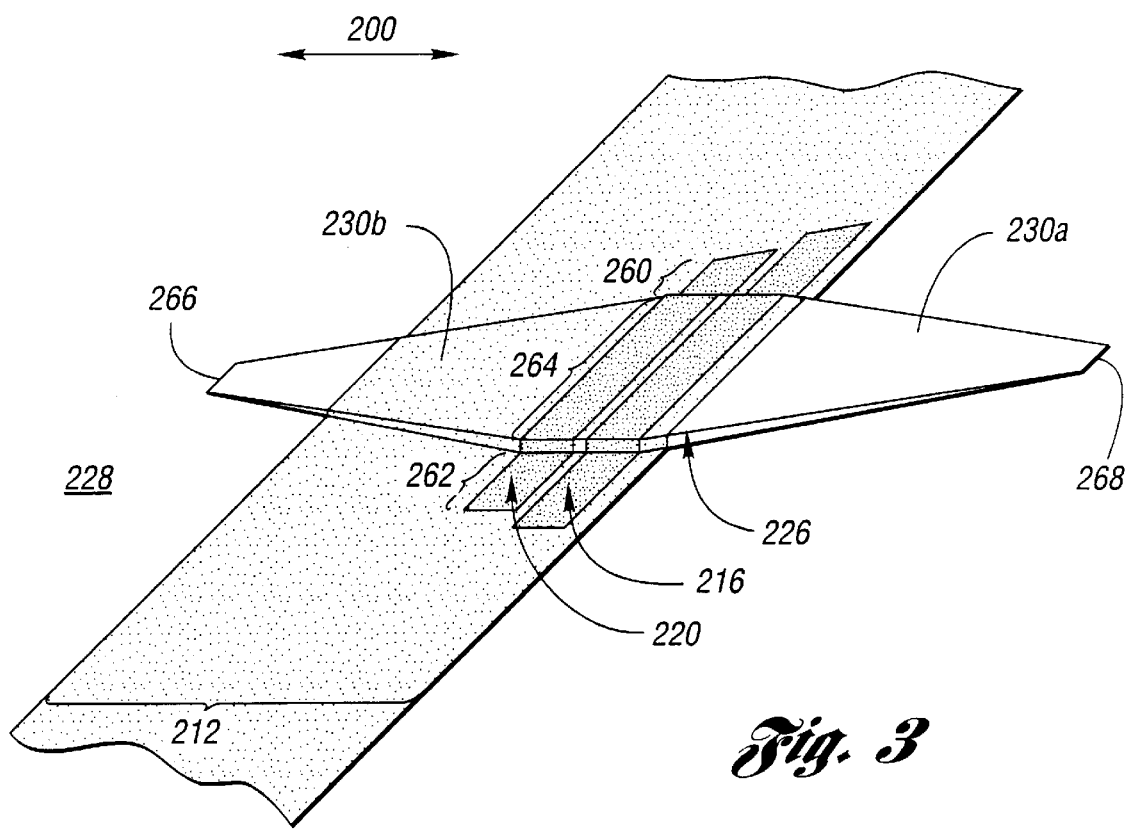
FIG. 3 is a perspective view of a write head where the mesa and pole tips protrude above the tape bearing surface.

FIG. 1 is a fragmented cross-sectional view of a magnetic head with a two pole magnetic write transducer. Substrate 10 provides a foundation for the fabrication of a thin film region 12. The substrate 10 is made of a durable material such as Aluminum Titanium Carbide. Thin film region 12 is formed of alternating layers of a nonmagnetic insulating material and a soft magnetic material that define an undercoat 14, bottom pole tip 16, pole tip gap 18, top pole tip 20 and overcoat 22 respectively. In the preferred embodiment, the undercoat 14, pole tip gap 18 and overcoat 22 are made of Alumina Oxide. Bottom pole tip 16 and top pole tip 20 are made of Cobalt Zirconium Tantalum. Other materials known in the art may also be used. Closure 24 caps the thin film region 12. Closure 24 is made of the same material as substrate 10 to provide symmetrical characteristics on either side of the thin film region 12. Mesa 26 is formed by removing the surrounding material in the tape bearing surface 28. Mesa surface 30 is also milled slightly making the bottom pole tip 16, pole tip gap 18, and top pole tip 20 the highest elements above the tape bearing surface 28, and thus the first elements that contact the magnetic medium. The structure shown in FIG. 1 can be repeated across the width of the magnetic head to produce a multi-track magnetic write head. The present invention allows for other types of write transducers using different materials and different patterns to be formed in the mesa 26.

The distance that the pole tips 16 and 20 protrude from the mesa surface 30, and the distance that the mesa 26 protrudes from the tape bearing surface 28 are selected based upon the wear rate of the materials used, and the planned lifetime of the magnetic head. At a minimum, the onset of pole tip recession is delayed due to the extra distance that the pole tips 16 and 20 must wear as compared with the tape bearing surface 28. Ideally, the mesa 26 and pole tips 16 and 20 initially protrude sufficiently so that the pole tips 16 and 20 do not wear below the tape bearing surface 28 over the planned lifetime of the magnetic head. In the preferred embodiment (using Aluminum Titanium Carbide to form the substrate 10 and closure 24, Alumina Oxide in the thin film region 12, and Cobalt Zirconium Tantalum for the poles 16 and 20) the mesa 26 protrudes above the tape bearing surface 28 approximately 0.8 micrometers. Pole tips 16 and 20 and the pole tip gap 18 protrude above the mesa surface 30 by approximately 0.2 micrometers.

FIG. 2 shows a fragmented cross sectional view of a magnetic head with a magneto-resistive element read transducer. The structure of this magnetic head is similar to that shown in FIG. 1. A substrate 110 and a closure 124 flank a thin film region 112. Within the thin film region 112, an undercoat 114 and an overcoat 122 flank a first shield 140 and a second shield 142. A magneto-resistive element 144 resides between, and is isolated from the shields 140 and 142 by a first gap 146 and a second gap 148. Mesa 126 is formed by removing material from the surrounding tape bearing surface 128. Finally the mesa surface 130 is milled slightly making the shields 140 and 142, the gaps 146 and 148, and the magneto-resistive element 144 the highest elements above the tape bearing surface 128. In the preferred embodiment, mesa 126 protrudes above the tape bearing surface 128 the same distance as the mesa 26 protrudes above the tape bearing surface 28 in FIG. 1. Also, shields 140 and 142, gaps 146 and 148 and the magneto-resistive element 144 protrude above mesa surface 130 the same distance as the poles 16 and 20 protrude above mesa surface 30 in FIG. 1. While FIG. 2 shows a magneto-resistive element read transducer, the present invention allows for other types of read transducers that protrude from the mesa 126, including combinations of read and write transducers, and magnetic heads having multiple transducers.

FIG. 3 is a perspective view of another magnetic write head having a tapered mesa 226. This structure can be repeated for magnetic heads having multiple transducers. The magnetic medium moves relative to the pole tips 216 and 220 along a longitudinal axis, shown as axis 200 of the tape bearing surface 228. To avoid any sharp edges, the height of mesa surfaces 230a and 230b are tapered along the longitudinal axis towards the tape bearing surface 228. The mesa surfaces 230a and 230b are at maximum distance from the tape bearing surface 228 adjacent pole tips 216 and 220 within thin film region 212, and at a smaller distance, or flush with the tape bearing surface 228 at outer ends 266 and 268. To help steer debris around the pole tips 216 and 220, the widths of the mesa surfaces 230a and 230b are also tapered along the longitudinal axis 200. Mesa surfaces 230a and 230b have a maximum width by pole tips 216 and 220, and a narrower width at the outer ends 266 and 268. A tapered mesa 226 may also be implemented using read transducers, and combinations of read and write transducers.

Figure 4:
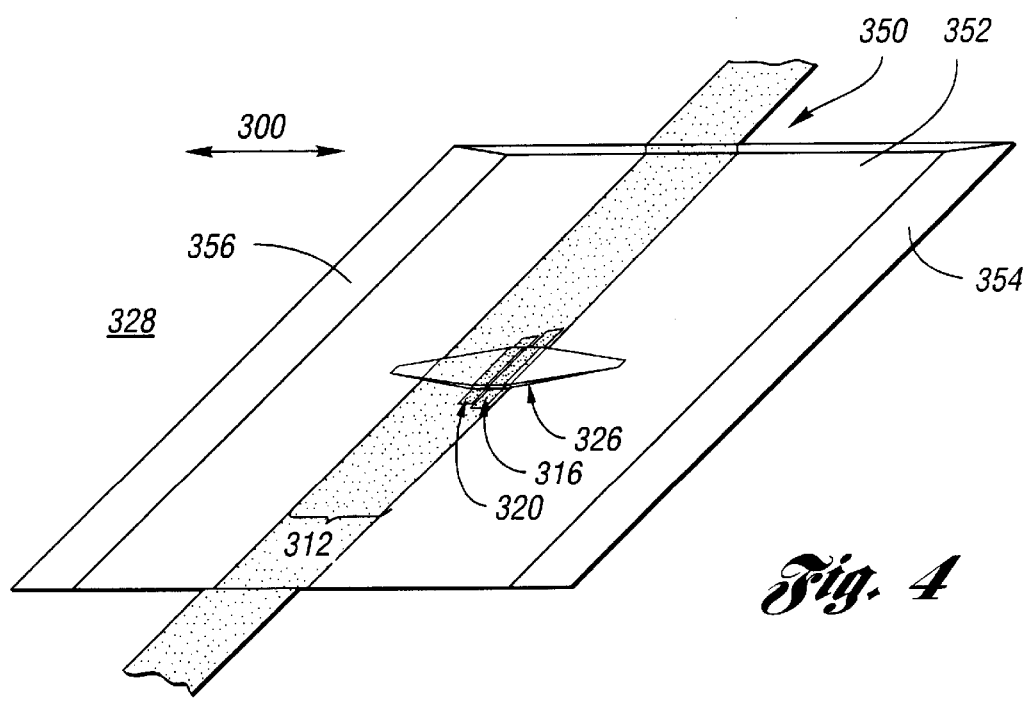
FIG. 4 is a perspective view of a write head where the mesa is situated inside a channel formed in the tape bearing surface.

FIG. 4 is a perspective view of another magnetic write head having a tapered mesa 326 in a recessed channel 350. Recessed channel 350 spans along the longitudinal axis, shown as axis 300, across the thin film region 312 and part of the tape bearing surface 328. The depth of recessed channel 350 is roughly equal to the distance mesa 326 protrudes above the channel floor 352. They do not have to be perfectly equal. The present invention only requires that pole tips 316 and 320 protrude above the tape bearing surface 328. In the preferred embodiment, the depth of recessed channel 350, and the maximum distance that the mesa 326 protrudes out of the channel floor 352 are both approximately 0.8 micrometers. This leaves pole tips 316 and 320 protruding approximately 0.2 micrometers above the tape bearing surface 328. All other features of the mesa 326 and pole tips 316 and 320 are the same as the mesa 226 and pole tips 216 and 220 shown in FIG. 3.

The mesa-in-channel approach reduces the wear rate of the pole tips 316 and 320. Tape bearing surface 328 in FIG. 4 provides additional support for the magnetic medium near the pole tips 316 and 320 as compared with the tape bearing surface 228 in FIG. 3. The additional support lowers the friction seen by the pole tips 316 and 320 by spreading out the pressure of the magnetic medium over a larger area.

Channel side walls 354 and 356 may be sloped to eliminate abrupt edges in the directions of the magnetic medium movement. The present invention accounts for magnetic medium that can move in both directions along the longitudinal axis 300. Sloping channel side walls 354 and 356 also reduces the collection of debris in the recessed channel 350. As with the structure shown in FIG. 3, the mesa-in-channel approach may also be applied to read transducers, combinations of read and write transducers, and to magnetic heads having multiple transducers.

The mesa-in-channel approach shown in FIG. 4 requires less milling than the structure shown in FIG. 3. In FIG. 3 approximately one micrometer of the entire tape bearing surface 228 must be removed, except for the mesa 226 itself. In FIG. 4 only 0.2 micrometers must be removed from the tape bearing surface 328. Only the recessed channel 350 must be milled to the full one micrometer depth. Milling may be accomplished using standard wet and dry techniques. Precession milling techniques are preferred for accurate position and width control of the pole tips of the write transducers. For example, a focused ion beam can precisely identify the desired location of the poles and selectively trim away surrounding features to an accuracy of about 0.5 micrometers. This allows for tight control over the location and active width of the transducers.

Referring back to FIG. 3, pole tip location and shape are important when writing data tracks of information on the magnetic medium. In general, the width of the data track is a function of the shape and size of the trailing pole tip. As a result, the width of data tracks written by asymmetrical top pole tip 220 and bottom pole tips 216 depend upon the direction of the magnetic medium. The present invention eliminates top and bottom pole tip asymmetry by milling away the two end sections 260 and 262 of the pole tips 216 and 220 that extend off the mesa structure 226. Since end section 260 and 262 are recessed approximately one micrometer below the central section 264, data written to the magnetic medium is determined only by the shape of the central section 264. Narrowing the effective width of pole tips 216 and 220 allows narrower data tracks to be written, which in turn allows for higher data track densities.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A magnetic head assembly for use with a magnetic medium, the magnetic head assembly comprising:

a tape bearing surface having a longitudinal axis, and a transverse axis perpendicular to the longitudinal axis, wherein the magnetic medium moves in a direction parallel to the longitudinal axis;

at least one mesa protruding a first distance from the tape bearing surface; and at least one transducer, wherein one transducer of the at least one transducer protrudes a second distance from each mesa of the at least one mesa respectively, wherein the at least one mesa has two outer ends and a width perpendicular to the longitudinal axis, each outer end of the two outer ends being displaced from the respective transducer in opposite directions along the longitudinal axis, and wherein the width varies from a maximum width adjacent to the respective transducer to a narrower width at the two outer ends.

2. A magnetic head assembly for use with a magnetic medium, the magnetic head assembly comprising:

a tape bearing surface having a longitudinal axis, and a transverse axis perpendicular to the longitudinal axis, wherein the magnetic medium moves in a direction parallel to the longitudinal axis;

at least one mesa protruding a first distance from the tape bearing surface, the at least one mesa having a width perpendicular to the longitudinal axis of the tape bearing surface; and at least one transducer, wherein one transducer of the at least one transducer protrudes a second distance from each mesa of the at least one mesa respectively, the at least one transducer having two end sections that extend in opposite directions beyond the width of the respective mesa, and the two end sections are approximately flush with the tape bearing surface.

3. The magnetic head assembly of claim 1 wherein the at least one mesa has two outer ends, each outer end of the two outer ends being displaced from the respective transducer in opposite directions along the longitudinal axis, and wherein the protruding of the at least one mesa varies from the first distance adjacent to the respective transducer to a smaller distance at the two outer ends.

4. The magnetic head assembly of claim 1 wherein the at least one transducer is a read transducer.

5. The magnetic head assembly of claim 1 wherein the first distance is approximately 0.8 micrometers.

6. The magnetic head assembly of claim 1 wherein the second distance is approximately 0.2 micrometers.

7. The magnetic head assembly of claim 1 wherein the at least one transducer is a write transducer.

8. A magnetic head assembly for use with a magnetic medium, the magnetic head assembly comprising:

a tape bearing surface having a longitudinal axis, and a transverse axis perpendicular to the longitudinal axis, and wherein the magnetic medium moves in a direction parallel to the longitudinal axis;

at least one channel formed in the tape bearing surface, the at least one channel having a floor disposed at a depth below the tape bearing surface;

at least one mesa, wherein one mesa of the at least one mesa is disposed in each channel of the at least one channel respectively and protrudes a first distance from the floor of each channel of the at least one channel respectively; and at least one transducer, wherein one transducer of the at least one transducer is disposed upon each mesa of the at least one mesa respectively and protrudes a second distance from each mesa of the at least one mesa respectively, wherein the sum of the first distance and the second distance exceeds the depth of the at least one channel.

9. The magnetic head assembly of claim 8 wherein the at least one mesa has a width perpendicular to the longitudinal axis of the tape bearing surface, and the at least one transducer has two end sections that extend in opposite directions beyond the width of the respective mesa, and the two end sections are approximately flush with the respective floor.

10. The magnetic head assembly of claim 8 wherein the at least one mesa has two outer ends, each outer end of the two outer ends being displaced from the respective transducer in opposite directions along the longitudinal axis, and wherein the protruding of the at least one mesa varies from the first distance adjacent to the respective transducer to a smaller distance at the two outer ends.

11. The magnetic head assembly of claim 8 wherein the at least one mesa has two outer ends and a width perpendicular to the longitudinal axis, each outer end of the two outer ends being displaced from the respective transducer in opposite directions along the longitudinal axis, and wherein the width varies from a maximum width adjacent to the respective transducer to a narrower width at the two outer ends.

12. The magnetic head assembly of claim 8 wherein the depth of the at least one channel is approximately equal to the first distance.

13. The magnetic head assembly of claim 8 wherein the at least one channel has a pair of sloping side walls parallel to the transverse axis and non-normal to the floor of the at least one channel.

14. The magnetic head assembly of claim 8 wherein the first distance is approximately 0.8 micrometers.

15. The magnetic head assembly of claim 8 wherein the second distance is approximately 0.2 micrometers.

16. The magnetic head assembly of claim 8 wherein the depth of the at least one channel is approximately 0.8 micrometers.

17. The magnetic head assembly of claim 8 wherein the at least one magnetic transducer is a write transducer.

18. The magnetic head assembly of claim 8 wherein the at least one magnetic transducer is a read transducer.

* * * * *